United States Patent [19]
Parker

[11] Patent Number: 5,600,231
[45] Date of Patent: Feb. 4, 1997

[54] DEVICE FOR TESTING AND REFRESHING BATTERIES

[75] Inventor: Robert Parker, Alamo, Calif.

[73] Assignee: Avery Dennison Corporation, Pasadena, Calif.

[21] Appl. No.: 416,647

[22] Filed: Apr. 5, 1995

[51] Int. Cl.[6] .......... H01M 10/44; H01M 10/48; G01N 27/416

[52] U.S. Cl. .............. 320/48; 320/13; 324/435; 429/90

[58] Field of Search .................. 320/4, 13, 35, 320/48; 324/104, 435; 429/90, 91, 93; 359/44

[56] References Cited

U.S. PATENT DOCUMENTS

| | | | |
|---|---|---|---|
| 3,667,039 | 5/1972 | Garfein et al. | 324/92 |
| 3,725,898 | 4/1973 | Canton | 340/324 |
| 3,877,008 | 4/1975 | Payne | 340/324 |
| 3,897,643 | 8/1975 | Morris, Jr. et al. | 40/28 |
| 4,006,414 | 2/1977 | Parker | 324/106 |
| 4,571,533 | 2/1986 | Dey | 320/25 |
| 4,673,256 | 6/1987 | Hehlen et al. | |
| 4,702,564 | 10/1987 | Parker. | |
| 4,726,661 | 2/1988 | Parker. | |
| 4,737,020 | 4/1988 | Parket. | |
| 4,835,476 | 5/1989 | Kurosawa | 324/435 |
| 5,059,895 | 10/1991 | Cataldi et al. | 324/104 |
| 5,128,616 | 7/1992 | Palmer | 324/435 |
| 5,179,337 | 1/1993 | Staarman et al. | 320/13 |
| 5,216,371 | 6/1993 | Nagai | 324/428 |
| 5,223,780 | 6/1993 | Hu | 320/14 |
| 5,339,024 | 8/1994 | Kuo et al. | 324/435 |
| 5,355,089 | 10/1994 | Treger | 324/435 |
| 5,389,470 | 2/1995 | Parker et al. | 429/90 |
| 5,417,575 | 5/1995 | McTaggart | 434/317 |
| 5,458,992 | 10/1995 | Bailey | 429/93 |
| 5,460,902 | 10/1995 | Parker et al. | 429/90 |

FOREIGN PATENT DOCUMENTS 1100479  4/1989  Japan.

Primary Examiner—Stuart N. Hecker
Assistant Examiner—Patrick B. Law
Attorney, Agent, or Firm—Renner, Otto, Boisselle & Sklar, P.L.L.

[57] ABSTRACT

A testing device includes a refresh circuit having a refresh resistor and electrically conductive leads for coupling the refresh resistor to a battery through a first switch and a diode, a test circuit including a heat generating element and electrically conductive leads for coupling the heat generating element to the battery through a second switch and the diode, a refresh display coupled to the refresh circuit for a visual indication that the device is in a refresh mode, and a test display thermally coupled to the heat generating element for visual display of the relative charge of the battery.

22 Claims, 2 Drawing Sheets

DEVICE FOR TESTING AND REFRESHING BATTERIES

FIELD OF THE INVENTION

The invention relates generally to testing and discharging devices and, more particularly, to a device for testing the charge level of a battery as well as for discharging the battery to a controlled charge level so as to minimize battery memory effects.

BACKGROUND OF THE INVENTION

Devices employing thermochromic materials for testing the relative charge on a battery are well known. An example of one such device is that commonly found in a package of Duracell® batteries. This type of device uses a tapered resistance conductor printed on one side of a thin polyester film with a thermochromic material printed in the other side of the film. When a voltage is applied across the tapered resistance conductor, a portion of the conductor roughly proportional to the charge of the battery is heated sufficiently to cause a corresponding portion of the thermochromic material to change from opaque to transparent, thus providing an indication of the relative voltage or charge of the battery. These devices work well for batteries, such as alkaline batteries, in which the relative voltage varies significantly from a fully charged condition to a depleted condition, for example, 50 percent or from 1.55 volts to 0.80 volts.

However, these tapered resistance devices do not work as well for some other types of batteries where the voltage delivered by a depleted battery is not a significant percent lower than the voltage delivered by a fully charged battery. For example, a lead-acid battery which is typically used in a car, truck or boat exhibits a very small change in voltage with respect to a large decrease in the charge of the battery. For instance, a lead-acid car battery may be at 13 volts when fully charged and decrease only to 12 volts when the battery is completely discharged.

Rechargeable nickel-cadmium batteries, for example, such as are used in portable computers, video cameras and power tools, also exhibit a relatively small change in voltage with respect to a large change in battery charge. In the case of nickel-cadmium batteries it is also desirable to be able to measure the voltage of the battery accurately in order to ascertain when the battery needs to be recharged. Nickel-cadmium batteries have a memory effect and thus should be almost completely discharged before recharging to promote a complete charge and longer battery life. However, these batteries should not be discharged completely or voltage reversal of the battery can result.

Many consumer electronic devices, such as portable computers and video cameras, shut off when the voltage the battery or battery pack delivers drops below a minimum operating voltage, indicating that the battery charge is substantially depleted. This minimum operating voltage is often higher than the charge level below which the battery must be discharged to so as not to develop the mentioned memory effect upon successive recharge cycles. If the battery is then recharged without having first been discharged further, the battery may thus begin to develop a memory of this lower charge level which over several cycles negatively effects the total charge that the battery can deliver.

It would be desirable to provide a device which could test the charge level of a battery and which was also capable of controllably discharging the battery below a charge level where the battery is not prone to the memory effect.

SUMMARY OF THE INVENTION

The tester and refresher device of the present invention combines testing and refreshing electronics in a single package, preferably employing a single diode to control the minimum charge level to which a battery can be discharged and to bias the testing electronics so as to test voltages over a relatively narrow operating range. The device is preferably in the form of a label which can be adhered to the housing or casing of a battery or battery pack as original equipment on the battery or battery pack.

According to one aspect of the invention, a battery system includes a rechargeable battery, a refresh circuit including a refresh resistor electrically coupled to the battery through a refresh switch and a diode, a test circuit including a heat generating element electrically coupled to the battery through a second switch and the diode, and a first temperature responsive display thermally coupled to the heat generating element for visual display of the relative charge of the battery.

According to another aspect of the invention, a testing device includes a refresh circuit including a refresh resistor and electrically conductive leads for coupling the refresh resistor to a battery through a first switch and a diode, a test circuit including a heat generating element and electrically conductive leads for coupling the heat generating element to the battery through a second switch and the diode, and a first temperature responsive display thermally coupled to the heat generating element for visual display of the relative charge of the battery.

According to a further aspect of the invention, a testing device includes a refresh circuit including a visual refresh display, a refresh resistor and electrically conductive leads for coupling the refresh resistor to a battery through a first switch and a diode, and a test circuit including a visual test display and electrically conductive leads for coupling the visual test display to the battery through a second switch and the diode.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figure 1:
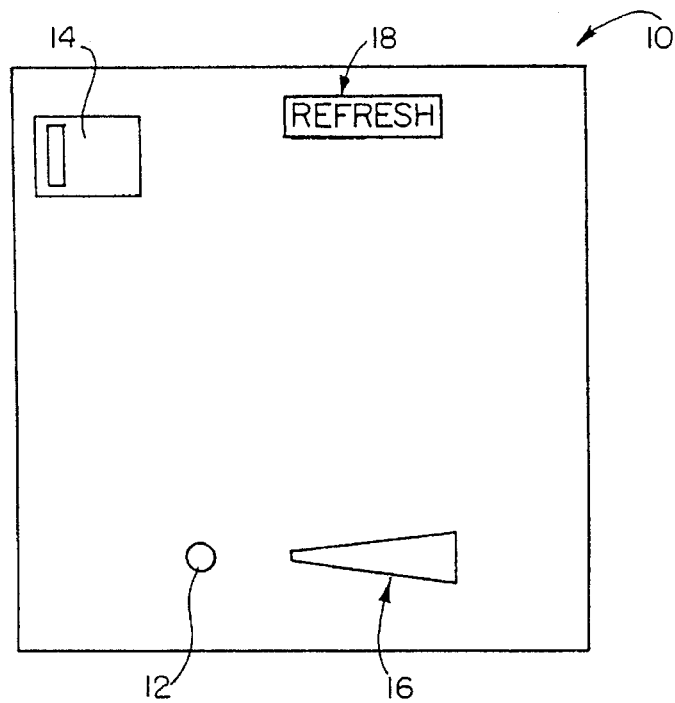
FIG. 1 is an illustration of one embodiment of the device of the present invention.

With reference to the several figures, and initially to FIG. 1, there is illustrated a battery tester and refresher device 10 in accordance with one embodiment of the present invention which is capable of both measuring the voltage or charge level of a battery and discharging the battery to a certain charge level. The device 10 preferably is in the form of a label or the like adapted for securement to the housing of a battery or battery pack as original equipment on the battery or battery pack. The device 10 includes a test switch 12 and a refresh switch 14 for selecting the operating mode of the device. The test switch 12 is an intermittent switch that while depressed places the device 10 in a testing mode whereby the device tests the battery to determine the charge level of the battery and provides an indication of the charge level on a test display 16. The refresh switch 14, which is a two position switch, when set to the "ON" position, places the device 10 in a refresh mode wherein the battery is controllably discharged to a certain charge level. Discharge of the battery during the refresh mode is indicated on the refresh display 18.

The test display 16 and refresh display 18 are preferably temperature responsive displays including at least one thermochromic material which exhibits a discernible visible change at a predetermined transition temperature. The thermochromic material may be of a certain opaque color, e.g, black, which obstructs the viewing of a color or image beneath the thermochromic material when the material is below its transition temperature. Upon heating the thermochromic material above the transition temperature, the material becomes transparent, thus exposing the color or image located beneath the thermochromic material. In the case of the test display 16, the thermochromic material may reveal, when heated above its transition temperature, a band of a certain color with the length of the band indicating the charge level of the battery. The thermochromic material of the refresh display 18 may reveal a message, such as the word "REFRESH," when heated above its transition temperature to indicate the device is in the refresh mode.

In use, a battery user would typically test the charge level of the battery by depressing the test switch 12 which causes the test display 16 to be heated to a degree depending on the charge level of the battery, as is discussed more fully below. The user can the look at the test display 16 to ascertain whether the battery has enough charge to suit the user's needs. The test display 16 may indicate that the battery is fully charged, depleted, or at some intermediate charge level. Based on the charge level indicated, the user can decide whether or not to recharge the battery. For example, while a battery may be only half discharged, the user may need a fully charged battery, such as for powering a laptop or notebook computer on a long flight. If the user has used the testing mode of the device and determined that the battery needs to be recharged, or if it is apparent from the use of an electronic device that the battery needs to be recharged, the user will move the refresh switch 14 to the "ON" position, placing the device in the refresh mode and causing the battery to be discharged to a desired level. While the battery is discharging the refresh display 18 is heated so that its thermochromic material transitions to a transparent state thus revealing the message "REFRESH" to indicate that the refresh mode is in progress. Once the battery has been discharged below a desired level, the refresh display 18 is allowed to cool to its opaque state, thus obstructing view of the refresh message and indicating that the device is no longer in the refresh mode. The battery can then be recharged without suffering the memory effect discussed above.

Figure 2:
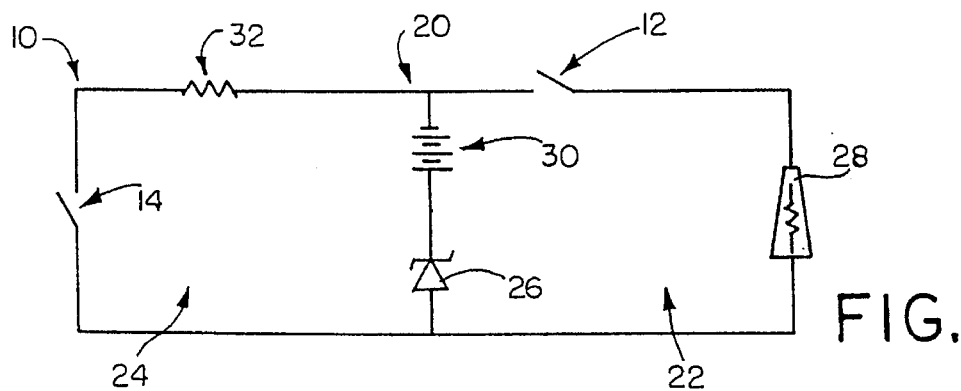
FIG. 2 is an electrical schematic diagram of the circuit of the device of FIG. 1.

Referring then to FIG. 2, there is illustrated an electrical schematic diagram of the circuit 20 for the device 10. The circuit 20 can be broken up into two separate circuits; one circuit performs the battery testing functions and is referred to herein as the test circuit 22, the other circuit performs the battery refresh operation and is referred to herein as the refresh circuit 24. Discussing first the test circuit 22, the circuit includes a diode 26, such as a zener diode or other electrical component, for example another form of diode or a transistor, etc., which substantially conducts current only when the voltage across the diode exceeds a threshold level, a tapered resistor 28 for generating heat and the test switch 12 all coupled in electrical series with a voltage source 30, such as a rechargeable NiCad battery. The tapered resistor 28 is positioned proximate the test display 16 and is thermally coupled to the test display so as to heat at least a portion of the display and cause a visually discernible change in the display under certain conditions.

The refresh circuit 24 includes a refresh resistor 32 and the refresh switch 14 in electrical series with the zener diode 26 and battery 30. The refresh resistor 32 is positioned adjacent the refresh display 18 so as to heat the display when current is flowing through the refresh resistor 32 so as to cause a visually discernible response in the display.

The zener diode 26 acts upon the test circuit 22 as a switch to bias the voltage produced by the battery 30 so that little or no current will flow through the circuit until a specific threshold conducting voltage of the zener diode is exceeded. At voltages supplied by the battery 30 exceeding the threshold conducting voltage of the zener diode 26, the diode will conduct electricity at a current which is a function of the combined internal resistance of the diode and the resistance of the tapered resistor 28 and the amplitude of the voltage produced by the battery exceeding the threshold voltage of the zener diode. In this manner, the zener diode 26 biases the test circuit 22 so that relatively small voltage changes produced by the battery 30 can be accurately measured and displayed by the test display 16.

When a battery test is performed on a relatively depleted battery by depressing the test switch 12, as the battery is capable of impressing across the test circuit 22 a voltage which is less than the threshold conducting voltage of the zener diode 26, there will be substantially no current flow through the circuit 22 and the tapered resistor 28. Consequently, the test display 16 will not be significantly heated and the thermochromic material will not change from its opaque state.

When the battery 24 is charged sufficiently to impress upon the test circuit 22 a voltage exceeding the threshold voltage of the zener diode 26, a current, which is a function of the voltage of the battery 30 exceeding the threshold conducting voltage of the diode and the internal resistance of the diode and the resistance of the tapered resistor 28, will cause the tapered resistor to generate heat as a function of that current and the resistance of the tapered resistor. The heat generated by the tapered resistor 28 is dissipated to the test display 16. For voltages of the battery 30 exceeding the threshold voltage of the zener diode 26 only slightly, a relatively small area of the tapered resistor 28 having a small cross-sectional area will generate sufficient heat to cause a corresponding area of the thermochromic material in the test display 16 to transition to its transparent state to reveal a small colored portion below the thermochromic material. For greater voltages exceeding the threshold voltage of the zener diode 26, a larger portion of the tapered resistor 28 including sections having relatively larger cross-sectional areas will generate sufficient heat to cause greater corresponding portions of the thermochromic material in the test display 16 to transition to its transparent state to reveal greater areas of the colored material below. Consequently, by using a zener diode 26 in series with the tapered resistor 28 and test display 16, a battery test 10 can be made to provide a relatively accurate response over a small voltage range through the biasing action of the zener diode.

It will be apparent that the same or equivalent functioning of the test display 16 can be accomplished using a variety of displays, including a temperature responsive display having a number of thermochromic materials in conjunction with a non-tapered resister and other like displays. Other examples of temperature responsive displays can be found in U.S. Pat. No. 5,389,470 and U.S. patent application Ser. Nos. 08/138,363 and 08/307,341, the disclosures of which are incorporated herein by this reference.

In the refresh circuit 24, the zener diode 26 acts as a switch to disable current flow through the refresh circuit when the voltage produced by the battery 30 has dropped below the threshold conducting voltage of the zener diode. When it is desired to refresh or discharge the battery, the refresh switch 14 is moved to the "ON" position thus closing the refresh circuit 24. The battery 30 will thus discharge through the zener diode 26 and the refresh resistor 32 at a current which is a function of the combined internal resistance of the zener diode and the resistance of the refresh resistor and the amplitude of the voltage produced by the battery exceeding the threshold voltage of the zener diode. The energy dissipated by the refresh resistor 32 in the form of heat is used to heat the refresh display 18, thus causing the thermochromic material therein to transition to a transparent state to reveal the refresh message. Once the battery 30 has been discharged to the point that its voltage is equal to the threshold voltage of the zener diode 26, the zener diode will act as a switch to prevent further discharge of the battery through the circuit 24. Once the battery voltage has dropped to the threshold conducting voltage of the zener diode 26, and current flow through the circuit 24 and refresh resistor 32 is disabled, the refresh display 18 will cool and the thermochromic material will once again become opaque obstructing view of the refresh message. In this way the battery 30 can be controllably discharged to a voltage at which it is not susceptible to memory effect upon recharging without risking polarity reversal or other damage to the battery that may result if the battery is discharged to a greater extent.

By choosing a zener diode 26 with a correct threshold conducting voltage and appropriate resistance values for the tapered resistor 28 and refresh resistor 32 as well as thermochromic materials with appropriate transition temperatures, the test display 16 can be made to visually indicate different conditions of the battery, such as fully charged, partially charged and significantly depleted, while the refresh display 18 can be made to indicate that the battery is discharging. A suitable zener diode 26 for use in the circuit 20 will have a threshold conducting voltage below the operating voltage range of the battery 30 as well as slightly below the voltage to which the battery 30 must be discharged to minimize memory effects upon recharging the battery. As an example, a NiCad battery typically used in a video camera powers the camera over a voltage range of between generally 7 volts and 5.9 volts. A zener diode 26 would thus be chosen with a threshold conducting voltage which is both less than the minimum operating voltage, 5.9 volts, and slightly less than the voltage to which the battery must be discharged so as to avoid a memory effect upon recharge of the battery. A suitable value for the threshold conducting voltage of the zener diode when used in conjunction with such a NiCad battery may be approximately 5.1 volts. As a result, when the device 10 is in the test mode, the battery voltage will be tested and displayed on the test display 16 over a voltage range from 5.1 volts to 7 volts. When the device 10 is in the refresh mode, the battery will be discharged to 5.1 volts.

Figure 3:
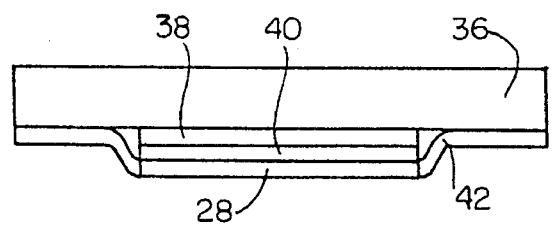
FIG. 3 is a cross section of the device generally through the test display.

A cross-section of the device 10 generally through the area of the test display 16 is shown in FIG. 3. The device 10 preferably includes a thin transparent film 36, such as a polyester film, which forms the backbone of the device. Adjacent the film 36 is disposed a layer of thermochromic material 38 of the test display 16. The thermochromic material may be disposed on or applied to the film 36 through a variety of conventional methods including, for example, printing. An exemplary thermochromic material useful in the invention is that sold under the designation R45 Matsui Ink by Matsui Chemical Company, Kyoto, Japan; the designation "45" indicating a transition temperature of about +45° C. Although other thermochromic materials having other transition temperatures may be used. Moreover, another exemplary material useful in the invention is that known as liquid crystal material. Other materials also may be used to provide the desired display characteristics in response to or as a function of temperature. As many thermochromic and other temperature responsive materials are sensitive to UV light and, when subjected to UV light, may tend to degrade over time, it is beneficial to provide UV protection to the device. One method of protecting the thermochromic material from UV light is to provide a protective coating between the thermochromic material and the ambient light. It may also be possible to incorporate additives directly with the thermochromic materials to protect them from UV light. An example of such an additive would be an anti-oxidant. Such an anti-oxidant could be included as an additive to the thermochromic material and/or to an encapsulating material containing such thermochromic material.

Disposed atop the thermochromic layer 38 is a layer of a colored material 40 which provides the color response of the test display 16 when the thermochromic material is in a transparent state. Disposed on the colored material 40 is the tapered resistor 28. Attached to the tapered resistor 28 are conductive leads 42 which extend away from the tapered resistor to complete the test circuit 22. The electrically conductive components, such as the tapered resistor 28 and the conductive leads 42 are preferably applied through a conventional printing technique.

The refresh display 18 and the refresh resistor 32 would be constructed on the film 36 in much the same way as the test display 16 and tapered resistor 28, except that the colored material 40 would preferably include a message, such as the word "REFRESH" printed on a colored background.

Figure 4:
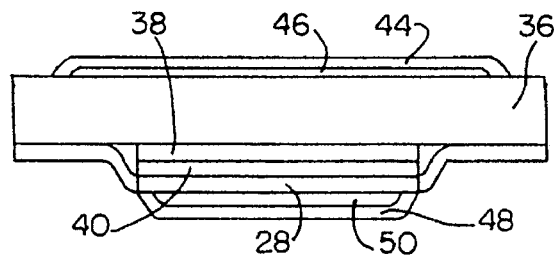
FIG. 4 is a cross section of the device generally through a test display having a thermal insulator.

It is desirable to thermally isolate the test display 16 from the battery casing to which the device is mounted as well as from thermal noise from the surrounding environment, such as a finger touching the display. FIG. 4 shows the test display 16 of FIG. 3 including thermal isolation. An insulating film 44 is attached along its periphery to the top of the film 36 opposite the test display 16 with a pocket of air 46 separating the film 36 and the insulating film 44. A similar insulating film 48 is attached to the tapered resistor 28 trapping an air pocket 50 between the insulating film and the tapered resistor. In each case the air pocket forms a thermal insulator preventing heat generated by the tapered resistor from being dissipated to the battery casing and preventing heat transfer to or from a foreign object through the film 36.

Figure 5:
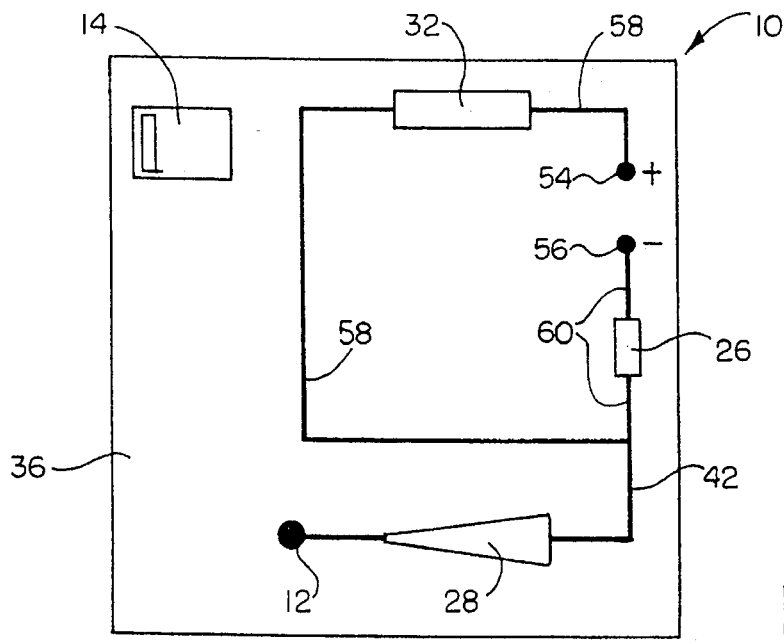
FIG. 5 is an illustration of the circuitry of the device as mounted on the thin film, looking through the film.

The components and printed circuitry on the rear of the device 10 for securement to the battery casing are shown in FIG. 5, which is a view looking through the thin film 36. The device 10 includes a pair of contact pads 54 and 56 for electrical contact with corresponding pads on a battery casing. The contact pad 54 contacts a corresponding pad on the battery casing which is electrically coupled to the positive terminal of the battery through the refresh switch 14. The contact pad 56 contacts a pad on the battery casing which is electrically coupled to the negative terminal of the battery. The test switch 12 is positioned above a corresponding contact pad on the battery casing electrically coupled to the positive terminal of the battery for intermittent contact with the pad when the test switch is depressed. The contact pad 56, the contact of the test switch 12, the tapered resistor 28, and the conductive leads 42 and 60 completing the test circuit 22 as well as the contact pad 54, the refresh resistor 32 and the conductive leads 58 and 60 completing the refresh circuit 24 are all preferably printed on or proximate to the side of the film 36 forming the rear of the device 10. The zener diode 26 may be surface mounted to the film 36 with its contacts in electrical contact with the conductive leads 60 or alternatively, the zener diode may be located on a circuit board separately mounted on or within the battery casing and suitably connected to the conductive leads 60. The refresh switch 14 is mounted within an opening in the film 36 and coupled, through connections to contact pads on the battery casing, to the positive terminal of the battery and to the contact pad 54 of the refresh circuit. An electrically non-conductive coating (not shown) is preferably applied over the rear of the device 10 to protect the components and the leads with sufficient openings in the protective coating to permit the contact pads 54 and 56 and the pad of the test switch 12 to make electrical contact with corresponding pads on the battery casing.

The device 10 is mounted to the battery casing such as by a suitable adhesive with the contact pads 54 and 56 and the pad of the test switch 12 aligned with the corresponding contacts on the battery casing. The device is preferably an original equipment item applied to a battery casing by the battery manufacturer, although suitable modifications will be apparent to adapt the device for use with a battery as an aftermarket item.

Figure 6:
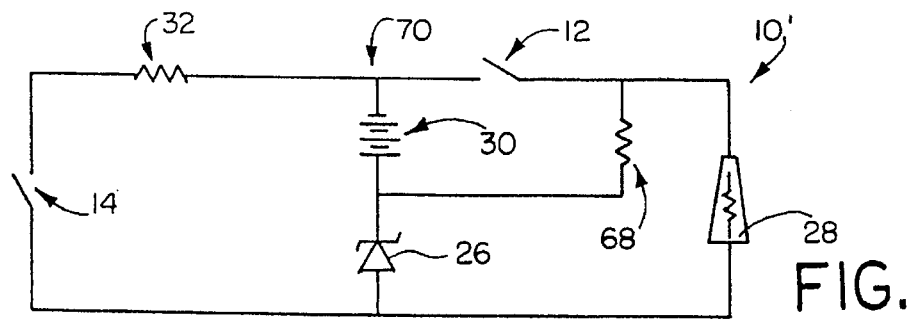
FIG. 6 is an electrical schematic diagram of an alternate embodiment of the device including an element for compensation of ambient temperature.

Since the temperature of the test display 16 is dependent not only on the heat supplied by the tapered resistor 28 but also on heat supplied by the ambient surroundings, under some conditions, it may be necessary for the tapered resistor 28 to generate more or less heat in order to achieve the desired response from the thermochromic material of the test display 16. For example, at low ambient temperatures more heat is required to elevate the thermochromic material of the test display 16 above its transition temperature to achieve the desired response for a given battery voltage than is required at higher ambient temperatures. FIG. 6 illustrates an electrical schematic diagram of a device 10' including compensation for ambient temperature. The device 10' includes a compensating element 68 which heats the test display 16 to a consistent absolute temperature regardless of the ambient temperature. Such a compensating element would typically exhibit a positive temperature coefficient of resistance over a range of temperatures with an abrupt increase in resistance as the element reaches a certain absolute temperature. An example of such a heater element is marketed by Raychem Corporation as "Polyswitch". Thermochromic materials for the test display 16 are then chosen with transition temperatures somewhat above the absolute temperature to which the compensating element heats the test display. The circuit 70 of FIG. 6 includes in part a compensating element 68 located proximate the tapered resistor 28 and electrically connected to the battery 30 in parallel with the zener diode 26 and the tapered resistor. As current flows through the circuit 70 the compensating element 68 generates heat increasing its temperature and the temperature of the tapered resister 28 and test display 12. Once the temperature of the compensating element 68 has reached a certain absolute temperature its resistance increases abruptly so that current predominantly flows only through zener diode 26 and tapered resistor 28. Heating of the tapered resistor 28 and the test display 16 above this point is then by the resistance heating effect of the tapered resister.

Figure 7:
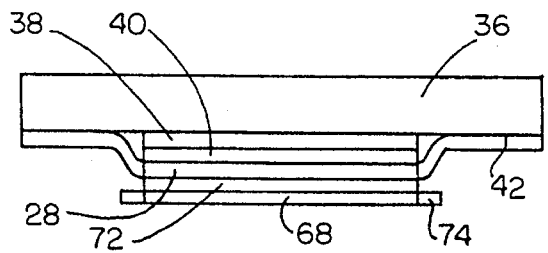
FIG. 7 is a cross section of the device of FIG. 6 generally through the test display.

As is shown in FIG. 7, the compensating element 68 is disposed atop the thermochromic layer 38, colored material 40 and tapered resistor 28 with a thin layer of dielectric material 72 electrically insulating the tapered resistor from the compensating element. Both the dielectric layer 72 and the compensating element 68 may be applied through conventional printing techniques with conductive leads 74 isolated from the conductive leads 42 and coupling the compensating element in series with the battery 30 and test switch 12 in the circuit 70 of FIG. 6.

Figure 8:
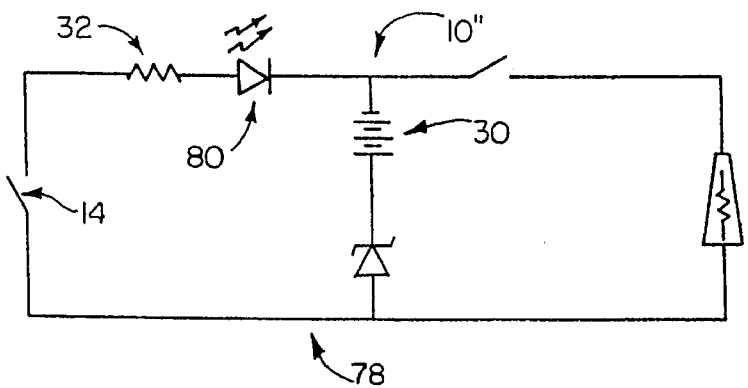
FIG. 8 is an electrical schematic of an alternate embodiment of the device including a light emitting diode.

An electrical schematic diagram of a circuit 78 for a further embodiment of the device 10" which employs a light emitting diode (LED) 80 to indicate that the device is in the refresh mode is illustrated in FIG. 8. The device 10" is substantially the same as the circuit 20 of FIG. 2 with the exception that an LED 80 is substituted for the thermochromic material of the refresh display 18. When the refresh switch is moved to the "ON" position, current flows through the circuit 78 thus causing the LED to emit visually discernible light. Use of the LED 80 may be advantageous is some situations where the refresh resistor 32 is required to dissipate a greater amount of heat to discharge the battery 30 over a reasonable time frame than a thermochromic material could tolerate without degrading.

What is claimed is:

1. A battery system, comprising:

a rechargeable battery;

a refresh circuit including a refresh resistor electrically coupled to the battery through a first switch and a diode;

a test circuit including a heat generating element electrically coupled to the battery through a second switch and said diode; and a first temperature responsive display thermally coupled to said heat generating element for visual display of the relative charge of the battery.

2. The battery system of claim 1, wherein said second switch is biased in an open condition.

3. The battery system of claim 1, including a second temperature responsive display thermally coupled to said refresh resistor.

4. The battery system of claim 1, wherein said refresh circuit and said test circuit are secured to a label.

5. The battery system of claim 1, wherein said refresh circuit and said test circuit are at least partially printed on a label.

6. The battery system of claim 5, said refresh circuit including conductors printed on said label for electrically coupling the refresh resistor to the battery.

7. The battery system of claim 5, said test circuit including conductors printed on said film for electrically coupling the heat generating element to the battery.

8. The battery system of claim 7, wherein said heat generating element is a tapered resistor printed on said label.

9. The battery system of claim 1, wherein said heat generating element is a tapered resistor.

10. A testing device, comprising:

a refresh circuit including a refresh resistor and electrically conductive electrical leads for coupling said refresh resistor to a battery through a first switch and a diode;

a test circuit including a heat generating element and electrically conductive electrical leads for coupling said heat generating element to the battery through a second switch and said diode; and a first temperature responsive display thermally coupled to said heat generating element for visual display of the relative charge of the battery.

11. The testing device of claim 10, wherein said refresh circuit and said test circuit are secured to a film.

12. The testing device of claim 11, wherein said first temperature responsive display is secured to the same side of the film that the test circuit is secured.

13. The testing device of claim 11, wherein said second temperature responsive display is secured to the same side of the film that the refresh circuit is secured.

14. The testing device of claim 11, wherein said film is in the form a label.

15. The testing device of claim 14, wherein said label is adapted for use on a battery.

16. The battery system of claim 10, including a second temperature responsive display thermally coupled to said refresh resistor.

17. A testing device, comprising:

a refresh circuit including a visual refresh display means, a refresh resistor and electrically conductive leads for coupling said refresh resistor to a battery through a first switch and a diode; and, a test circuit including a visual test display means and electrically conductive leads for coupling said visual test display means to the battery through a second switch and said diode.

18. The testing device of claim 17, wherein said visual test display means includes a thermochromic material thermally coupled to a resistor.

19. The testing device of claim 17, including a heating element electrically coupled to the battery in parallel with the diode and the visual test display means, said heating element being thermally coupled to the visual test display means.

20. The testing device of claim 19, wherein said heating element has a positive temperature coefficient of resistance.

21. The testing device of claim 17, wherein said visual refresh display means is a light emitting diode.

22. The testing device of claim 17, wherein said visual refresh display means includes a thermochromic material thermally coupled to said refresh resistor.

* * * * *